US010229183B2

United States Patent
Kang et al.

(10) Patent No.: US 10,229,183 B2
(45) Date of Patent: Mar. 12, 2019

(54) SYSTEMS AND METHODS FOR ENABLING ACCESS TO A DOCUMENT BASED ON DOCUMENT TYPES AND GROUP ASSOCIATION OF USERS AND DOCUMENTS

(71) Applicant: LINE Corporation, Shibuya-ku, Tokyo (JP)

(72) Inventors: Woosik Kang, Seongnam-si (KR); Jin Ho Wang, Seongnam-si (KR); Geun Woo Shin, Seongnam-si (KR)

(73) Assignee: Line Corporation, Tokyo (JP)

( * ) Notice: Subject to any disclaimer, the term of this patent is extended or adjusted under 35 U.S.C. 154(b) by 293 days.

(21) Appl. No.: 15/205,137

(22) Filed: Jul. 8, 2016

(65) Prior Publication Data
US 2017/0053016 A1 Feb. 23, 2017

(30) Foreign Application Priority Data
Aug. 18, 2015 (KR) ........................ 10-2015-0115991

(51) Int. Cl.
*G06F 17/30* (2006.01)
*G06F 17/21* (2006.01)

(52) U.S. Cl.
CPC ...... *G06F 17/30598* (2013.01); *G06F 17/218* (2013.01); *G06F 17/30011* (2013.01); *G06F 17/30029* (2013.01); *G06F 17/30525* (2013.01)

(58) Field of Classification Search
CPC ......... G06F 17/30011; G06F 17/30525; G06F 17/30598; G06F 17/30722;
(Continued)

(56) References Cited

U.S. PATENT DOCUMENTS

2004/0054692 A1* 3/2004 Seyrat ..................... H03M 7/30
707/E17.007
2008/0306943 A1* 12/2008 Patterson .......... G06F 17/30864
707/E17.017
(Continued)

FOREIGN PATENT DOCUMENTS

JP 2009048352 A 3/2009
KR 1019980071452 10/1998

OTHER PUBLICATIONS

Korean Office Action dated May 23, 2016 for corresponding Korean Application No. 10-2015-0115991.

*Primary Examiner* — Anh Ly
(74) *Attorney, Agent, or Firm* — Harness, Dickey & Pierce, P.L.C.

(57) ABSTRACT

A server is configured to generate a document tag identifying at least one of a first association and a second association for the document, the first association being an association between the document and at least one of a plurality of groups, the second association being an association between the document and one of a plurality of document types, generate a user tag identifying at least one of a third association and a fourth association for a user, the third association being an association between the user and at least one of the plurality of groups, the fourth association being an association between a type of a document requested by the user and at least one of the plurality of document types, and provide access to the requested document based on at least one of the first and second associations and at least one of the third and fourth associations.

20 Claims, 9 Drawing Sheets

(58) Field of Classification Search
CPC .. G06F 17/30029; G06F 17/218; G06F 17/30;
G06F 17/3087; G06F 17/30371; G06F
17/30303; G06Q 50/01; G06Q 50/30
See application file for complete search history.

(56) References Cited

U.S. PATENT DOCUMENTS

| | | | |
|---|---|---|---|
| 2009/0049053 A1* | 2/2009 | Barker | G06F 17/30011 707/E17.008 |
| 2009/0282100 A1* | 11/2009 | Kim | G06Q 10/107 709/203 |
| 2011/0113320 A1* | 5/2011 | Neff | G06Q 10/10 707/E17.01 |
| 2015/0263886 A1* | 9/2015 | Wang | H04L 41/08 370/254 |
| 2015/0269499 A1* | 9/2015 | B | G06Q 10/063 705/7.42 |
| 2016/0283947 A1* | 9/2016 | Yip | G06Q 30/016 707/E17.108 |
| 2016/0299645 A1* | 10/2016 | Shan | H04L 51/32 707/E17.008 |

* cited by examiner

SYSTEMS AND METHODS FOR ENABLING ACCESS TO A DOCUMENT BASED ON DOCUMENT TYPES AND GROUP ASSOCIATION OF USERS AND DOCUMENTS

CROSS-REFERENCE TO RELATED APPLICATIONS

A claim for priority under 35 U.S.C. § 119 is made to Korean Patent Application No. 10-2015-0115991 filed Aug. 18, 2015, in the Korean Intellectual Property Office, the entire content of which is hereby incorporated by reference.

BACKGROUND

Example embodiments of inventive concepts described herein relate to systems and methods for searching for documents based on the right to access the documents and types of the documents.

A plurality of documents may be managed in connection with one user account in a blog or a social network service (SNS), and the like. Such documents may be classified and managed for each group by users who have access to the documents. In this case, a system which provides a service may verify a group to which a user belongs, may compare a group which has access to documents with a group to which the user belongs, and may search for documents which are accessible by the user. For example, users may belong to one or more of a plurality of groups including a public group, a friend group, a school group, a company group, a baseball club group, and a family group. One document may be set to be accessible by users of the plurality of groups. In this case, assuming that a user belongs to the friend group and the baseball club group, the system separately searches for documents which are accessible to users of the friend group and documents which are accessible to users of the baseball club group. If identifiers for groups which are granted access certain documents are stored in connection with the documents, the system should separately determine whether an identifier (e.g., "friend") of the friend group and an identifier (e.g., "baseball club") of the baseball club group are stored in connection with the documents with respect to each of the documents.

Also, users may inquire about documents of a specific type. For example, it is assumed that types of documents include a photo type, a video type, a location type, and a uniform resource locator (URL) link type. In this case, a document of the photo type may refer to a document including an image such as a photo. A document of the video type may refer to a document including a video. A document of the location type may refer a document including information indicating a specific location such as a latitude/longitude coordinates of an object. A document of the URL type may mean a document including a URL link. If a user wants to inquire about the document of the video type, the system should separately verify documents classified as the video type with respect to all of the documents. For example, if a document A is classified as the video type, it may be stored and managed together with the identifier "video" of the video type. In this case, the system should determine whether the identifier "video" of the video type is stored together in connection with the document A to determine whether the document A is the document of the video type.

When the number of documents managed in connection with a user account increases, the cost of the above-described searches and subsequently granting access to a requested document increases due to the required memory and computational/processing capacity.

SUMMARY

In an example embodiment, a server includes a memory having computer-readable instructions stored therein and a processor. The processor configured to execute the computer-readable instructions to generate a document tag for a document, the document tag identifying at least one of a first association and a second association for the document, the first association being an association between the document and at least one of a plurality of groups, the second association being an association between the document and one of a plurality of document types, generate a user tag, the user tag identifying at least one of a third association and a fourth association for a user, the third association being an association between the user and at least one of the plurality of groups, the fourth association being an association between a type of a document requested by the user and at least one of the plurality of document types, and provide access to the requested document based on at least one of the first association and the second association and at least one of the third association and the fourth association.

In yet another example embodiment, the processor is configured to execute the computer-readable instructions to perform an operation using the document tag and the user tag, and provide access to the requested document based on a result of the operation.

In yet another example embodiment, the processor is configured to execute the computer-readable instructions to compare the result of the operation to a value, and provide access to the requested document if the result of the comparison is greater than the value.

In yet another example embodiment, the document tag has a first portion and a second portion, the first portion corresponding to the first association, the second portion corresponding to the second association. The user tag has a third portion and a fourth portion, the third portion corresponding to the third association, the fourth portion corresponding to the fourth association. The result of the operation has a fifth portion and a sixth portion, the fifth portion corresponding to a result of the operation between the first and third portions, the sixth portion corresponding to a result of the operation between the second and fourth portions.

In yet another example embodiment, the processor is configured to execute the computer-readable instructions to provide access to the requested document, if the fifth portion of the result is greater than a first value and the sixth portion of the result is the same as the second and fourth portions.

In yet another example embodiment, the processor is configured to execute the computer-readable instructions to store a first plurality of tags for the plurality of groups, store a second plurality of tags for the plurality of document types, select, as a first tag, one of the first plurality of tags that identifies the first association, select, as a second tag, one of the second plurality of tags that identifies the second association, and generate the document tag by combining the first tag and the second tag.

In yet another example embodiment, the processor is configured to execute the computer-readable instructions to generate the user tag by identifying the third association by determining one or more of the plurality of groups to which the user belongs, identifying the fourth association by determining one or more of the plurality of document types associated with the requested document, generating a third tag for the third association, generating a fourth tag for the fourth association, and combining the third tag and the fourth tag to generate the user tag.

In yet another example embodiment, the first tag is a stream of bits in which one or more bits corresponding to one or more of the plurality of groups to which the document belongs have a first value, while remaining bits of the first tag have a second value. The second tag is a stream of bits in which one or more bits corresponding to one or more of the plurality of document types to which the document belongs have the first value, while remaining bits of the second tag have the second value. The third tag is a stream of bits in which one or more bits corresponding to the one or more of the plurality of groups to which the user belongs have the first value, while remaining bits of the third tag have the second value. The fourth tag is a stream of bits in which one or more bits corresponding to the one or more of the plurality of documents associated with the requested document have the first value, while remaining bits of the fourth tag have the second value.

In yet another example embodiment, the processor is configured to execute the computer-readable instructions to perform the operation by performing a logical AND operation between the document tag and the user tag.

In yet another example embodiment, each of the plurality of groups has one or more users associated therewith, and the plurality of document types include a single one of or a combination of a video type, a text type, a location type, a photo type, and a location type.

In one example embodiment, a non-transitory computer-readable medium includes computer-readable instructions, which when executed by a processor, cause the processor to generate a document tag for a document, the document tag identifying at least one of a first association and a second association for the document, the first association being an association between the document and at least one of a plurality of groups, the second association being an association between the document and one of a plurality of document types, generate a user tag, the user tag identifying at least one of a third association and a fourth association for a user, the third association being an association between the user and at least one of the plurality of groups, the fourth association being an association between a type of a document requested by the user and at least one of the plurality of document types, and provide access to the requested document based on at least one of the first association and the second association and at least one of the third association and the fourth association.

In yet another example embodiment, the execution of the computer-readable instructions by the processor further cause the processor to perform an operation using the document tag and the user tag, and provide access to the requested document based on a result of the operation.

In yet another example embodiment, the execution of the computer-readable instructions by the processor further cause the processor to compare the result of the operation to a value, and provide access to the requested document if the result of the comparison is greater than the value.

In yet another example embodiment, the document tag has a first portion and a second portion, the first portion corresponding to the first association, the second portion corresponding to the second association. The user tag has a third portion and a fourth portion, the third portion corresponding to the third association, the fourth portion corresponding to the fourth association. The result of the operation has a fifth portion and a sixth portion, the fifth portion corresponding to a result of the operation between the first and third portions, the sixth portion corresponding to a result of the operation between the second and fourth portions.

In yet another example embodiment, the execution of the computer-readable instructions by the processor further cause the processor to provide access to the requested document, if the fifth portion of the result is greater than a first value and the sixth portion of the result is the same as the second and fourth portions.

In yet another example embodiment, the execution of the computer-readable instructions by the processor further cause the processor to store a first plurality of tags for the plurality of groups, store a second plurality of tags for the plurality of document types, select, as a first tag, one of the first plurality of tags that identifies the first association, select, as a second tag, one of the second plurality of tags that identifies the second association, and generate the document tag by combining the first tag and the second tag.

In yet another example embodiment, the execution of the computer-readable instructions by the processor cause the processor to generate the user tag by identifying the third association by determining one or more of the plurality of groups to which the user belongs, identifying the fourth association by determining one or more of the plurality of document types associated with the requested document, generating a third tag for the third association, generating a fourth tag for the fourth association, and combining the third tag and the fourth tag to generate the user tag.

The first tag is a stream of bits in which one or more bits corresponding to one or more of the plurality of groups to which the document belongs have a first value, while remaining bits of the first tag have a second value. The second tag is a stream of bits in which one or more bits corresponding to one or more of the plurality of document types to which the document belongs have the first value, while remaining bits of the second tag have the second value. The third tag is a stream of bits in which one or more bits corresponding to the one or more of the plurality of groups to which the user belongs have the first value, while remaining bits of the third tag have the second value. The fourth tag is a stream of bits in which one or more bits corresponding to the one or more of the plurality of documents associated with the requested document have the first value, while remaining bits of the fourth tag have the second value.

In yet another example embodiment, the processor is configured to execute the computer-readable instructions to perform the operation by performing a logical AND operation between the document tag and the user tag.

In yet another example embodiment, each of the plurality of groups has one or more users associated therewith, and the plurality of document types include a single one of or a combination of a video type, a text type, a location type, a photo type, and a location type.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Figure 1:
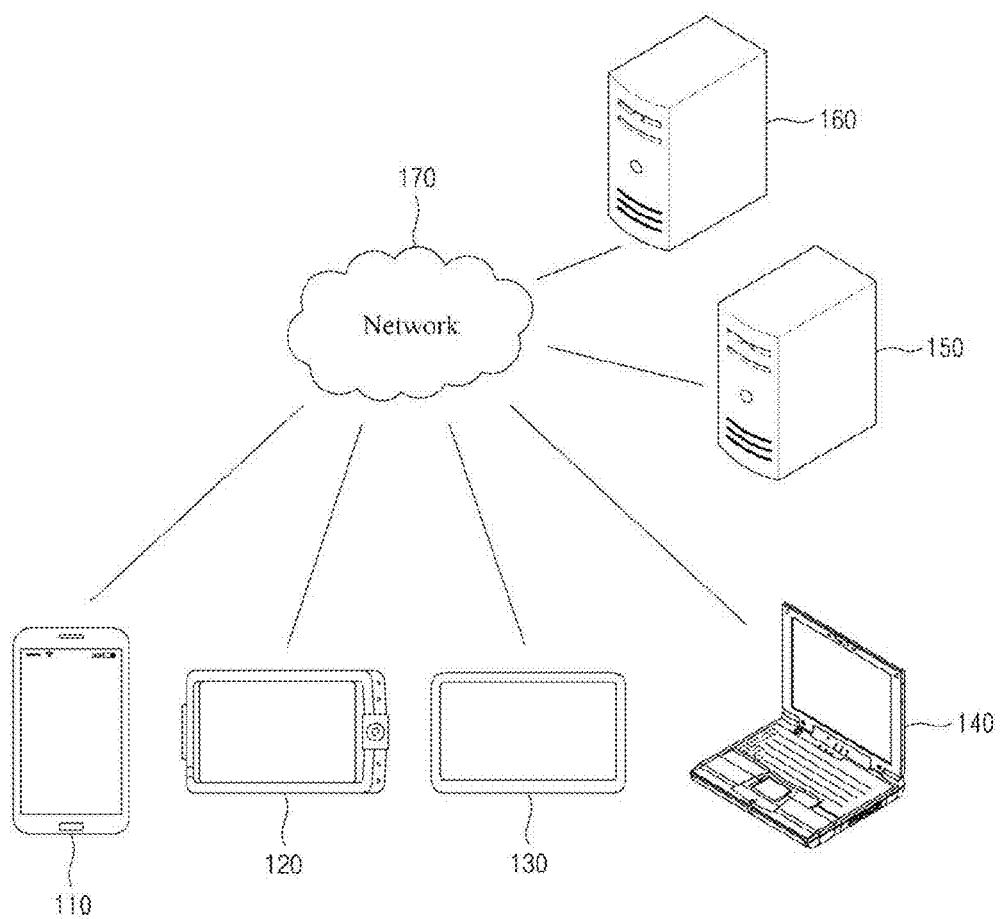
FIG. 1 illustrates a network environment according to an example embodiment.

Example embodiments will be described in detail with reference to the accompanying drawings. Inventive concepts, however, may be embodied in various different forms, and should not be construed as being limited only to the illustrated/described example embodiments. Rather, these example embodiments are provided so that this disclosure will be thorough and complete, and will fully convey the inventive concepts to those skilled in the art. Accordingly, known processes, elements, and techniques are not described with respect to some of the example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "example" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, a description will be given in detail for example embodiments of inventive concepts with reference to the accompanying drawings. However, inventive concepts are not limited by the example embodiments. Also, with respect to the descriptions of the drawings, like reference numerals refer to like elements.

FIG. 1 illustrates a network environment according to an example embodiment. In FIG. 1, the network environment 100 may include a plurality of electronic devices 110 to 140, a plurality of servers 150 and 160, and a network 170. However, the number of electronic devices and the number of servers is not limited to that shown in FIG. 1 and may be more or less.

Each of the electronic devices 110 to 140 may be a fixed terminal or a mobile terminal implemented with a computer device. For example, the plurality of electronic devices 110 to 140 may be any one of, but not limited to, a smart phone, a mobile phone, a navigation device, a computer, a notebook, a digital broadcasting terminal, a personal digital assistant (PDA), a portable multimedia player (PMP), a tablet personal computer (PC), and the like. In one example embodiment, the electronic device 110 may communicate with the other electronic devices 120 to 140 and/or the servers 150 and 160 through the network 170 using a wired or wireless communication scheme. In one example embodiment, any known, or to be developed, means for establishing communication between the components of the network environment 100 may be utilized.

For example, there may be a communication scheme using a local area wireless communication network between devices as well as a communication scheme using a communication network (e.g., a mobile communication network, a wired internet, a wireless internet, and a broadcasting network) which may be included in the network 170. For example, the network 170 may be one or more of a personal area network (PAN), a local area network (LAN), a campus area network (CAN), a metropolitan area network (MAN), a wide area network (WAN), a broadband network (BBN), and the Internet. Also, the network 170 may include, but is limited to, one or more of network topologies which include a bus network, a star network, a ring network, a mesh network, a star-bus network, a tree or hierarchical network, and the like.

Each of the servers 150 and 160 may be implemented with a computer device or a plurality of computer devices which may communicate with the plurality of electronic devices 110 to 140 through the network 170 to provide an instruction, a code (e.g., a set of computer-readable instructions), a file, content, a service, and the like to the plurality of electronic devices 110 to 140.

For example, the server 160 may provide a file for installing an application on the electronic device 110 connected through the network 170. In this case, the electronic device 110 may install the application using the file provided from the server 160. Also, the electronic device 110 may connect to the server 150 under control of an operating system (OS) and at least one program (e.g., a browser or the installed application) included in the electronic device 110 and may receive a service or content provided from the server 150 (or sent from another device to the electronic device 110 via the server 150). For example, if the electronic device 110 sends a service request message to the server 150 through the network 170 under control of the application, the server 150 may send a code (e.g., a set of computer readable instructions) corresponding to the service request message to the electronic device 110. The electronic device 110 may configure and display a screen corresponding to the code under control of the application to provide content to a user of the electronic device 110.

Figure 2:
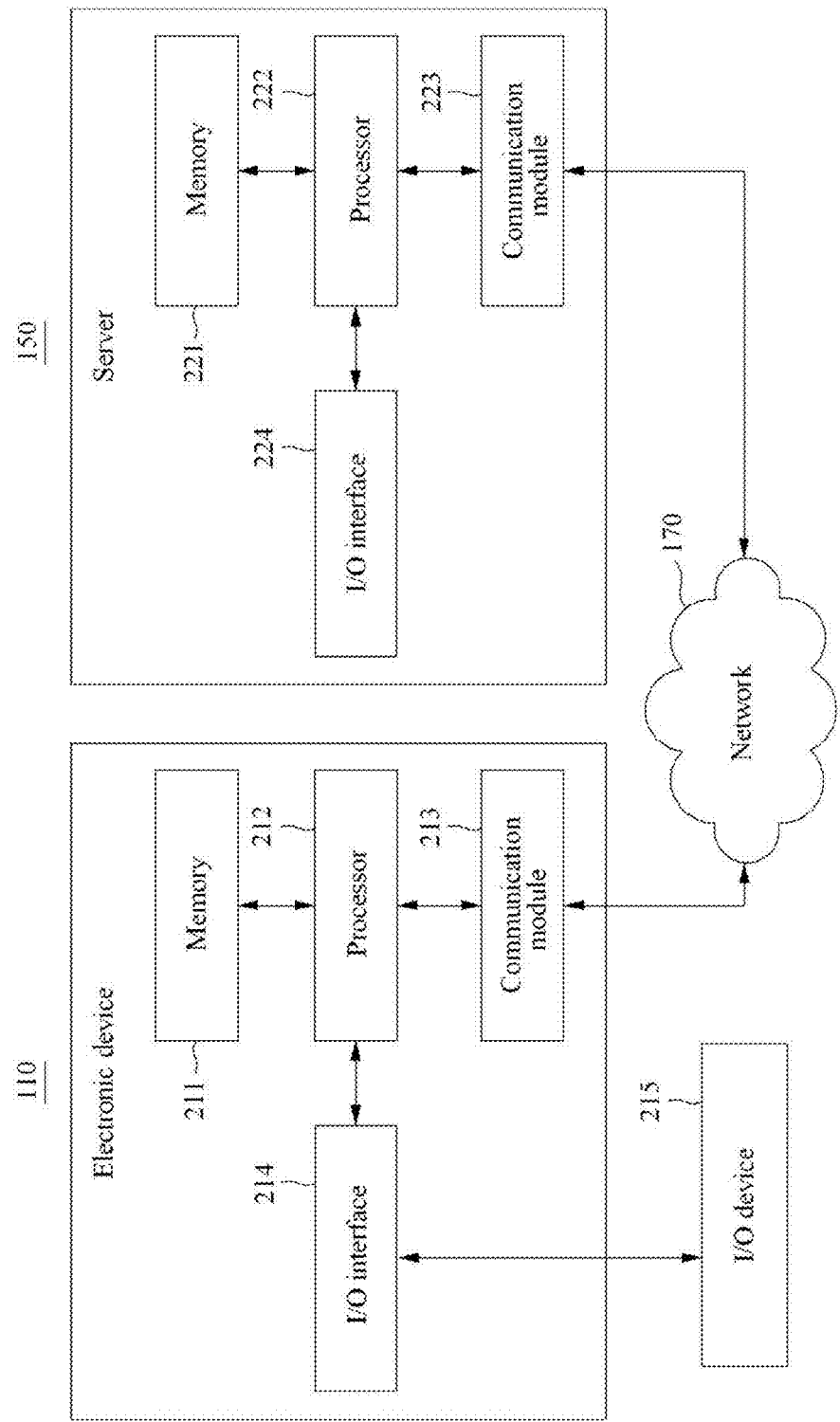
FIG. 2 is a block diagram illustrating a configuration of an electronic device and a configuration of a server according to an example embodiment.

FIG. 2 is a block diagram illustrating a configuration of an electronic device and a configuration of a server according to an example embodiment. With reference to FIGS. 1 and 2, components of the electronic device 110 may be the same or similar to those of each of the other electronic devices 120 to 140 of FIG. 1, and components of the server 150 may be the same or similar to those of the other server 160 of FIG. 1. Accordingly, the components of the electronic device 110 and the server 150 will be described with reference to FIG. 2, as a representative of the electronic devices 110 to 140 and the servers 150/160, respectively.

The electronic device 110 may include a memory 211, a processor 212, a communication module 213, and an input and output interface 214. The server 150 may include a memory 221, a processor 222, a communication module 223, and an input and output interface 224. Each of the memories 211 and 221 may be a computer-readable recording medium and may include a permanent mass storage device such as a random access memory (RAM), a read only memory (ROM), and a disc drive. Also, the memory 211 may store an OS and at least one program code (e.g., a code for a browser or application installed and driven in the electronic device 110). The memory 221 may store an OS and at least one program code. These software components may be loaded from a computer-readable recording medium, which in one example embodiment, is independent of the memories 211 and 221, using a drive mechanism. This computer-readable recording medium may include computer-readable recording media such as a floppy drive, a disc, a tape, a digital versatile disc/compact disc-ROM (DVD/CD-ROM) drive, and a memory card.

In one example embodiment, the software components may be stored in and loaded from the memories 211 and 221 through the communication modules 213 and 223, respectively, rather than an independent computer-readable recording medium described above. For example, at least one program may be loaded into each of the memories 211 and 221 based on a program (e.g., the above-mentioned application) installed by files provided through the network 170 by developers or a file distribution system (e.g., the above-mentioned server 160), which distributes a file for installing an application.

Each of the processors 212 and 222 may be configured to process an instruction of a computer program by performing basic arithmetic, logic, and input and output operations. The instruction may be provided to the processor 212 by the memory 211 or the communication module 213. The instruction may be provided to the processor 222 from the memory 221 or the communication module 223 (e.g., the above-described computer-readable instructions may be loaded from the memory 221 to the processor 222 via the communication module 223). For example, each of the processors 212 and 222 may be configured to execute an instruction received based on a program code stored in a storage device such as the memories 211 and 221. Accordingly, the execution of such computer-readable instructions/program codes transform the processor 212 and/or the processor 222 into a special purpose processor configured to carry out respective functionalities of the electronic device 110 or the server 150, as will be described below.

Each of the communication modules 213 and 223 may provide a function such that the electronic device 110 and the server 150 communicate with each other through the network 170 and may provide a function such that another electronic device (e.g., the electronic device 120) and another server (e.g., the server 160) communicate with one another through the network 170. For example, a request (e.g., a streaming service request for content) generated by the processor 212 of the electronic device 110 based on a program code stored in a recording device such as the memory 211 may be transmitted to the server 150 through the network 170 under control of the communication module 213. In contrast, a control signal or instruction, content, a file, and the like provided under control of the processor 222 of the server 150 may be received in the electronic device 110 through the communication 213 of the electronic device 110, through the communication module 223 and the network 170. For example, the control signal or instruction of the server 150, received through the communication module 213, may be sent to the processor 212 or the memory 211. The content or file of the server 150 may be stored in a storing medium which may be further included in the electronic device 110.

The input and output interface 214 may be a means for interfacing with the input and output device 215. For one example, the input device may include a device such as a keyboard, or a mouse. The output device may include a device such as a display for displaying a communication session of an application. In one example embodiment, the input and output interface 214 may be a means for interfacing with a device, such as a touch screen, in which an input function and an output function are integrated into one. Specifically, in processing (e.g., implementing) computer-readable instructions loaded from the memory 211 into the processor 212, the processor 212 of the electronic device 110 may display a service screen or content, configured using data provided from the server 150 or the electronic device 120, on a display of the electronic device 110 through the input and output interface 214.

Also, in one or more example embodiments, the electronic device 110 may include more known/conventional, or to be developed, components other than those shown in FIG. 2. The server 150 may include more known/conventional, or to be developed, components other than those shown in FIG. 2. However, detailed descriptions of such components are not necessary within the scope of the present example embodiments. For example, the electronic device 110 may be implemented to include at least some of components of the above-mentioned input and output device 215 or may further include other components such as a transceiver, a global positioning system (GPS) module, a camera, various sensors, and a database.

Figure 3:
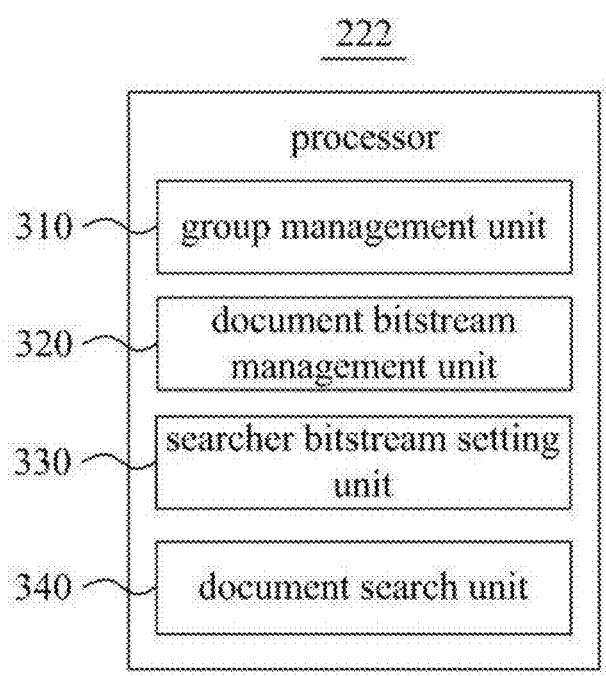
FIG. 3 is a block diagram illustrating a detailed configuration of a processor of a server according to an example embodiment.
Figure 4:
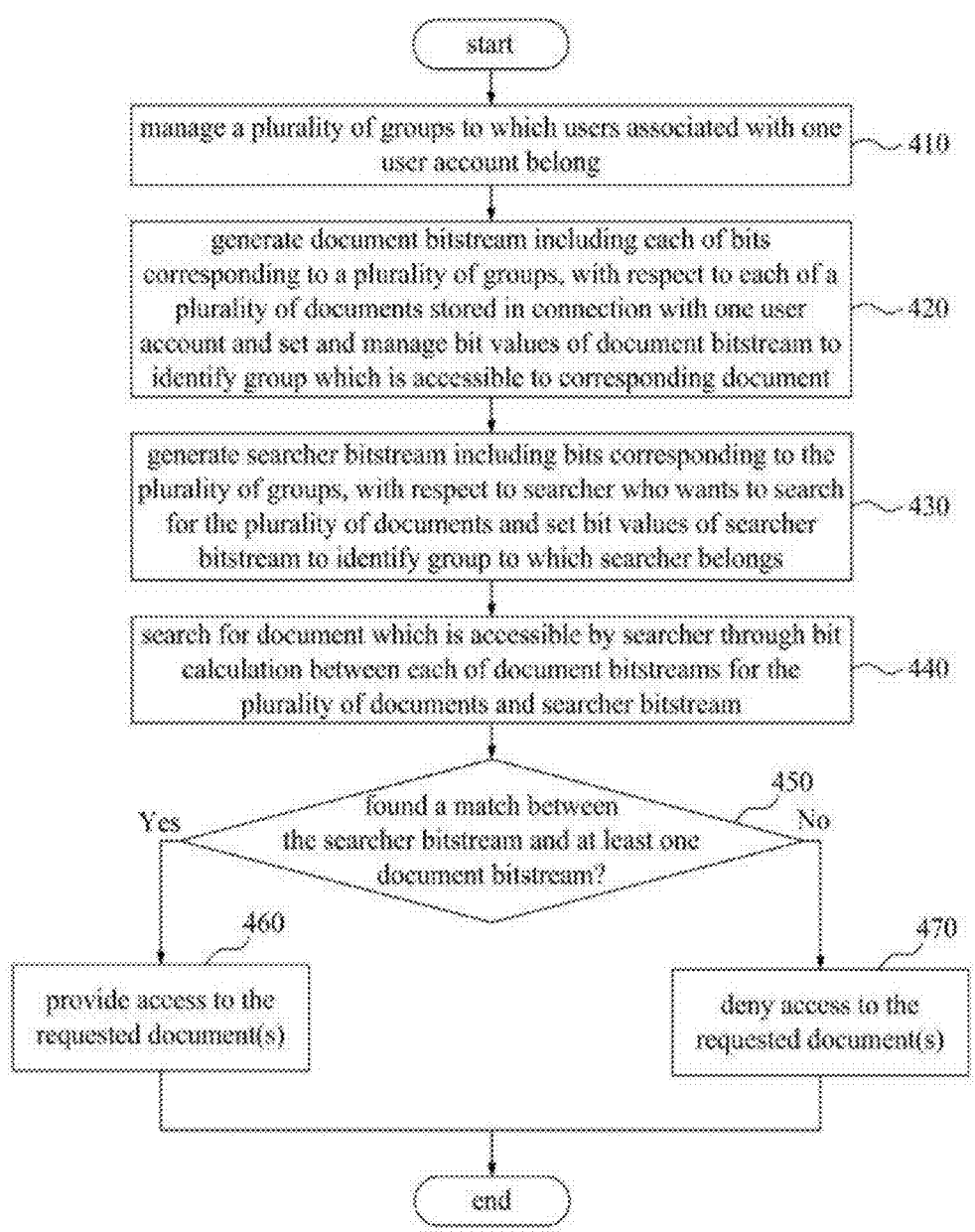
FIG. 4 is a flowchart illustrating a method performed by a server according to an example embodiment.

FIG. 3 is a block diagram illustrating a detailed configuration of a processor of a server according to an example embodiment. FIG. 4 is a flowchart illustrating a method performed by a server according to an example embodiment. As shown in FIG. 3, a processor 222 of a server 150 of FIG. 2 may include a group management unit 310, a document bitstream management unit 320, a searcher bitstream setting unit 330, and a document search unit 340. These components of the processor 222 may control the server 150 to perform steps 410 to 440 included in a method of FIG. 4. While FIG. 3 illustrates the processor 222 as having various units for performing various functions, the functionalities associated with each unit may be stored as computer-readable instructions on the memory 221 such that when loaded into the processor 222, they transform the processor into a special purpose processor for carrying out the functionalities of units 310-340. Furthermore, steps of FIG. 4 will be described below with reference to the server 150. However, it will be understood that the processor 222 carries out said steps by executing corresponding computer-readable instructions stored on the memory 221.

In step 410, the server 150 may manage a plurality of groups to which at least one user associated with one user account belongs. For example, the processor 222 may execute computer-readable instructions associated with the group management unit 310 to perform step 410.

The one user account may include an account which is assigned to (is associated with) a user of a blog service or a social network service (SNS). The users associated with the user account may be users who visit a site or a page and the like associated with the user account. At least one or more of the users may be users, such as friends or blog neighbors, who a user of the user account establishes a human relationship with. In this case, the user of the user account may classify and manage the one or more of the users into a plurality of groups.

Table 1 below represents an example of a plurality of groups to which users of a user account belong.

TABLE 1

| Group | Member | Bit Index |
|---|---|---|
| Public | Public | 0 |
| Friend | Friend | 1 |
| School | User a, User b | 2 |
| Company | User c, User d, User e, User f | 3 |
| Baseball Club | User a | 4 |
| Family | User g | 5 |

In the example embodiment of Table 1, users are classified into a public group, a friend group, a school group, a company group, a baseball club group, and a family group. These groups (e.g., the public group and the friend group) may be provided in advance as default settings. A user of a user account may directly set the groups (e.g., the school group, the company group, the baseball club group, and the family group).

One user may be associated with a plurality of groups. For example, in Table 1, "user a" is associated with the school group and the baseball club group. Also, "user a" may be associated with the public group. The public group may include all users associated with the user account.

The "member" of Table 1 may refer to users who belong to each group. The public member may mean all the users associated with the user account. The friend member may mean users who the user of the user account establishes a human relationship with. In one example embodiment, "user a" through "user-g" are identifiers of corresponding actual users.

In one example embodiment, the "bit index" of Table 1 indicates whether a bit of the Nth digit indicates a corresponding group in a bitstream described below. For example, the bit index 0 means that a bit of a first digit indicates the public group. The bit index 1 means that a bit of a second digit indicates the friend group, "0" and "1" are just mere examples and are non-limiting.

In step 420, the server 150 may generate a document bitstream (hereinafter the term bitstream may be used interchangeably with the term tag), including each of the bits corresponding to the plurality of groups, with respect to each of a plurality of documents stored in connection with the one user account and may set and manage bit values of the document bitstream to identify a group which has access to a corresponding document. For example, the processor 222 may execute computer-readable instructions associated with the document bitstream management unit 320 to perform step 420.

As described above, the user account may include an account which is assigned to a user of a blog service or an SNS. The plurality of documents may be documents stored by the user in connection with the assigned account. In one example embodiment, in case of a blog, a plurality of documents may be posts posted on the blog of a user account. In one example embodiment, in case of an SNS, a plurality of documents may be notices uploaded to a user account by the user.

The server 150 may generate a document bitstream per each of the plurality of documents. In this case, the document bitstream may include bits corresponding to the plurality of groups. Bit values of the document bitstream may be set to identify a group which has access to a corresponding document.

Hereinafter, example embodiments will be described using bitstreams as an example of a tag. However, a tag is not limited to a bitstream and may, for example, include a flag (e.g., a single digit number) or any other type of identifier that may be used to uniquely identify a document, a group, etc.

Table 2 below represents an example of document bitstreams in which bit values are set for 9 documents.

TABLE 2

| Document ID | Bit 5 | 4 | 3 | 2 | 1 | 0 | Accessible Group |
|---|---|---|---|---|---|---|---|
| 1 | 0 | 0 | 0 | 1 | 0 | 0 | School |
| 2 | 0 | 0 | 0 | 0 | 1 | 0 | Friend |
| 3 | 0 | 0 | 0 | 0 | 0 | 1 | Public |
| 4 | 0 | 0 | 1 | 0 | 0 | 0 | Company |
| 5 | 0 | 0 | 0 | 0 | 0 | 0 | Private |
| 6 | 0 | 1 | 0 | 1 | 0 | 0 | School, Baseball Club |
| 7 | 0 | 1 | 1 | 0 | 0 | 0 | Company, Baseball Club |
| 8 | 0 | 0 | 0 | 1 | 0 | 0 | School |
| 9 | 1 | 0 | 0 | 0 | 0 | 0 | Family |

Table 2 represents an example in which the bit stream "000100" is set for the document 1. As shown in Table 1, a bit index of the school group may be "2". Therefore, in document 1 where the accessible group is the school group, a bit value of a third digit corresponding to the bit index "2" may be set to 1, and the other bit values may be set 0. Similarly, in document 2 where the accessible group is the friend group, a bit value of a second digit corresponding to the bit index "1" may be set to 1.

The document 5 which is accessible by only the private group in Table 2 is a document which may be shown by only the user of the user account. In Table 2, an example embodiment is exemplified as all bit values of a document bitstream are set to 0.

Also, one document may be set to be accessible by users of a plurality of groups. It may be known that the document 6 is accessible by users of the school group and the baseball club group and that document 7 is accessible by users of the company group and the baseball club group. For example, it may be known that all of a bit value of a third digit corresponding to the bit index "2" of the school group and a bit value of a $5^{th}$ digit corresponding to the bit index "4" of the baseball club group are set to 1 in document 6.

In step 430, the server 150 may generate a searcher bitstream, including bits corresponding to the plurality of groups, with respect to a searcher who wants to search for the plurality of documents (which hereinafter may be referred to as requested document(s)) and may set bit values of the searcher bitstream to identify a group to which the searcher belongs. For example, the processor 222 may execute computer-readable instructions associated with the searcher bitstream setting unit 330 to perform step 430.

The searcher may refer to a user who visits a site or a page and the like associated with the user account. In other words, the server 150 may generate a searcher bitstream for each of the corresponding users before searching for documents when each user searches for/makes an inquiry for the documents upon visiting the site or the page. Bit values of a group to which the corresponding searcher belongs among bit values of the searcher bitstream may be set to 1, and bit values of a group to which the corresponding searcher does not belong among the bit values of the searcher bitstream may be set to 0.

Table 3 below represents an example of the searcher bit stream.

TABLE 3

| Searcher ID | Bit 5 | 4 | 3 | 2 | 1 | 0 | Group |
|---|---|---|---|---|---|---|---|
| User a | 0 | 1 | 0 | 1 | 1 | 1 | Public, Friend, School, Baseball club |

Assuming that "user a" of Table 1 has a friend relationship with the user of the user account, a searcher bitstream for "user a" in Table 1 may be set as shown in Table 3. Therefore, groups to which "user a" belongs may be the public group (the bit index 0), the friend group (the bit index 1), the school group (the bit index 2), and the baseball club group (the bit index 4). A bit value of a digit corresponding to bit indexes of the groups may be set to 1.

In step 440, the server 150 may search for a document which is accessible by the searcher by comparing bit values between each of document bitstreams for the plurality of documents and the searcher bitstream. For example, the processor 222 may execute computer-readable instructions associated with the document search unit 340 to perform step 440.

In this case, if a bit value of a specific digit is set to 1 in a bitstream of a corresponding document for the specific document, it may be meant that users of a group corresponding to the corresponding digit may access the corresponding document. If a bit value of the same digit is set to 1 in a searcher bitstream of a searcher, it may be known that the corresponding searcher may access a corresponding document.

Thereafter, at step 450, the server 150 determines whether a match has been found between the searcher bitstream and at least one document bitstream during the search performed at 440.

If at 450, the server 150 determines that a match has been found, then at 460, the server 150 grants access to the requested document(s). However, if at 450, the server 150 determines that a match has not been found, then at 470, the server 150 denies access to the requested document(s). Thereafter, the process may end.

In one example embodiment, the server 150 may provide a notification (e.g., a message) to the searcher to notify the search of the decision at 460 or 470.

As such, according to example embodiments, the server 150 may easily determine whether the searcher can access each document by simply comparing bitstreams, thus searching for documents which are accessible by the searcher efficiently.

For example, if a result value of a logical AND operation between bit values of a document bitstream set for a first document among a plurality of documents and bit values of a searcher bitstream is not 0, the server 150 may determine the first document as a document which is accessible by the searcher.

Table 4 below represents an example of searching for the document which is accessible by the searcher using a logical AND operation.

TABLE 4

|  | Bit | | | | | | Description |
|---|---|---|---|---|---|---|---|
|  | 5 | 4 | 3 | 2 | 1 | 0 |  |
|  | 0 | 0 | 0 | 0 | 1 | 0 | Document bitstream of document 2 |
| & | 0 | 1 | 0 | 1 | 1 | 1 | Searcher bitstream of searcher |
| = | 0 | 0 | 0 | 0 | 1 | 0 | Result of bit calculation |
| Result of bit calculation > 0 | 0 | 0 | 0 | 0 | 0 | 0 | Is result of bit calculation greater than 0? |

Table 4 represents the result "000010" of a logical AND operation between the document bitstream "000010" of the document 2 in Table 2 and the searcher bitstream "010111" in Table 3. In one example embodiment, a result greater than 0 ("000000") indicates that there is a bit value of the same digit which is set to 1 between the document bitstream and the searcher bitstream. Accordingly, the searcher may access the document 2, in the example embodiment of Table 4. In the example embodiment described above with reference to Table 4, a user of the school group (the bit index "2") may access the document 2, and the searcher may access the document 2 because the searcher belongs to the school group.

Table 5 below represents another example embodiment of searching for the document which is accessible by the searcher using a logical AND operation.

TABLE 5

|  | Bit | | | | | | Description |
|---|---|---|---|---|---|---|---|
|  | 5 | 4 | 3 | 2 | 1 | 0 |  |
|  | 0 | 0 | 1 | 0 | 1 | 0 | Document bitstream of document 2 |
| & | 0 | 1 | 0 | 1 | 1 | 1 | Searcher bitstream |
| = | 0 | 0 | 0 | 0 | 0 | 0 | Result of bit calculation |
| 0 | 0 | 0 | 0 | 0 | 0 | 0 | Is result of bit calculation greater than 0? |

Table 5 represents the result "000000" of a logically AND operation between the document bitstream "001000" of the document 4 in Table 2 and the searcher bitstream "010111" in Table 3. In this example embodiment, the result 0 indicates that there is no bit value of the same digit which is set to 1 between the document bitstream and the searcher bitstream. Accordingly, the searcher may not access the document 4 in the example embodiment of Table 5. In the example embodiment described above with reference to Table 5, a user of the company group (the bit index "3") may access the document 4, but the searcher may not access the document 4 because the searcher does not belong to the company group.

As such, the server 150 may easily and simply determine whether the searcher can access a document that the searcher may search for based on the result of simple bit calculation for bitstreams, thus reducing costs such as memory usage or the required computational capacity.

Tables 1 to 5 described above, represent example embodiments. However, the scope and spirit of inventive concepts may not be limited thereto. For example, kinds of groups or the number of groups may be changed in various ways based on user account settings. Furthermore, a comparison, instead of a logical AND operation, between bitstreams may be used to search for a document of a specific type that a searcher may be looking for.

Figure 5:
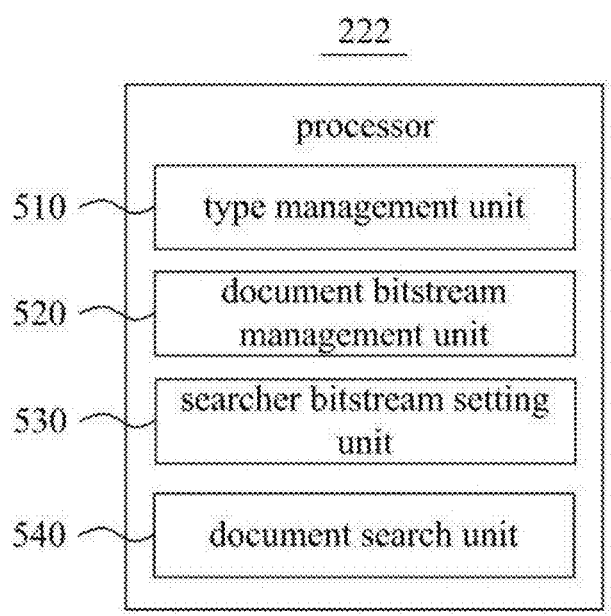
FIG. 5 is a block diagram illustrating a detailed configuration of a processor of a server according to an example embodiment.
Figure 6:
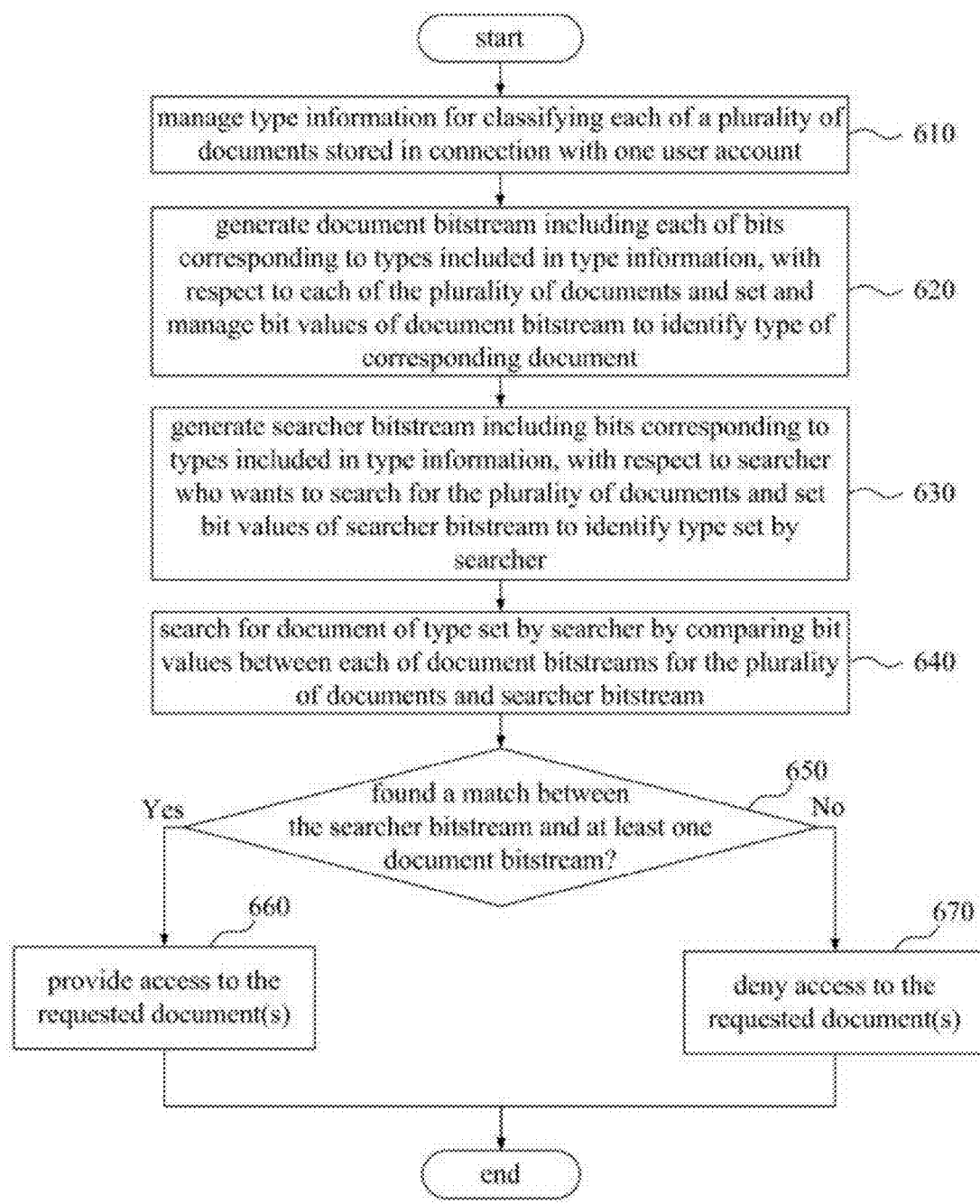
FIG. 6 is a flowchart illustrating a method performed by a server according to an example embodiment.

FIG. 5 is a block diagram illustrating a detailed configuration of a processor of a server according to an example embodiment. FIG. 6 is a flowchart illustrating a method performed by a server according to an example embodiment. As shown in FIG. 5, a processor 222 of a server 150 of FIG. 2 may include a type management unit 510, a document bitstream management unit 520, a searcher bitstream setting unit 530, and a document search unit 540. While FIG. 5 illustrates the processor 222 as having various units for performing various functions, the functionalities associated with each unit may be stored as computer-readable instructions on the memory 221 such that when loaded into the processor 222, they transform the processor into a special purpose processor for carrying out the functionalities of units 510-540. Furthermore, steps of FIG. 6 will be described below with reference to the server 150. However, it will be understood that the processor 222 carries out said steps by executing corresponding computer-readable instructions stored on the memory 221.

In step 610, the server 150 may manage type information for classifying each of a plurality of documents stored in connection with one user account. For example, the processor 222 may execute computer-readable instructions associated with the type management unit 510 to perform step 610.

For example, a type of a document may be classified based on whether the corresponding document includes any content. For one example, if the document includes a photo (or an image), the corresponding document may be classified as a photo type. If the document includes a video, the corresponding document may be classified as a video type. If the document includes both a photo and a video, the corresponding document may be classified into the photo type and the video type. In other words, one document may be classified as having one or more types.

Table 6 below represents an example of a bit index based on a category of a type and the corresponding type.

TABLE 6

| Type | Bit Index |
|---|---|
| Photo | 0 |
| Video | 1 |
| Location | 2 |
| URL link | 3 |

If location information such as a global positioning system (GPS) coordinate is included in a corresponding document, the corresponding document may be classified as a location type. If a uniform resource locator (URL) link is included in the corresponding document, the corresponding document may be classified as a URL type. The bit index may indicate a digit of a bit of a document bitstream described below.

In step 620, the server 150 may generate a document bitstream, including each of the bits corresponding to types included in the type information, with respect to each of the plurality of documents and may set and manage bit values of the bitstream to identify a type of a corresponding document. For example, the processor 222 may execute computer-readable instructions associated with the document bitstream management unit 520 to perform step 620.

Table 7 below represents an example of displaying types of documents through a document bitstream,

TABLE 7

| Document ID | Bit | | | | Type |
|---|---|---|---|---|---|
| | 3 | 2 | 1 | 0 | |
| 1 | 0 | 0 | 1 | 0 | Video |
| 2 | 1 | 1 | 0 | 0 | Location, URL link |
| 3 | 0 | 0 | 0 | 0 | Text |
| 4 | 0 | 0 | 0 | 1 | Photo |
| 5 | 0 | 0 | 0 | 0 | Text |
| 6 | 0 | 1 | 0 | 0 | Location |
| 7 | 0 | 0 | 0 | 1 | Photo |
| 8 | 1 | 1 | 0 | 0 | Location, URL link |
| 9 | 0 | 0 | 1 | 0 | Video |

For example, since including only a video, the document 1 may be classified as the video type and a bit value of a second digit corresponding to the bit index "1" of the video type is set to 1. In case of the documents 3 and 5 of the text type, all of bit values of a document bitstream are set to 0 because in example embodiments above text is not identified as a valid type for a document. Documents 2 and 8 are classified into two or more types.

In step 630, the server 150 may generate a searcher (user) bitstream, including bits corresponding to types included in the type information, with respect to a searcher who wants to search for the plurality of documents and may set bits values of the searcher bitstream to identify a type set by the searcher. For example, the processor 222 may execute computer-readable instructions associated with the searcher bitstream setting unit 530 to perform step 630.

Table 8 below is an example of a searcher bitstream for a type. In Table 8, a user a sets a type for inquiring about a document having a location type and a URL link type.

TABLE 8

| User ID | Bit | | | | Type |
|---|---|---|---|---|---|
| | 3 | 2 | 1 | 0 | |
| User a | 1 | 1 | 0 | 0 | Location, URL link |

In step 640, the server 150 may search for a document of the type set by the searcher by comparing bit values between each of document bitstreams for the plurality of documents and the searcher bitstream. For example, the processor 222 may execute computer-readable instructions associated with the document search unit 540 to perform step 640.

Thereafter, at step 650, the server 150 determines whether a match has been found between the searcher bitstream and at least one document bitstream during the search performed at 640.

If at 650, the server 150 determines that a match has been found, then at 660, the server 150 grants access to the requested document(s). However, if at 650, the server 150 determines that a match has not been found, then at 670, the server 150 denies access to the requested document(s). Thereafter, the process may end.

In one example embodiment, the server 150 may provide a notification (e.g., a message) to the searcher to notify the search of the decision at 660 or 670.

If a document bitstream of a specific document and a searcher bitstream are the same, the server 150 may search for the corresponding document as a document of a type the searcher wants. Specifically, if a resulting bit values of a logical AND operation between a document bitstream set for a first document among a plurality of documents and bit values of a searcher bitstream, are the same as bit values of the searcher bitstream, the server 150 may search for the first document as a document of the type set by the searcher. A description will be given of an example of bit calculation for this with reference to Table 9.

TABLE 9

| | Bit | | | | Description |
|---|---|---|---|---|---|
| | 3 | 2 | 1 | 0 | |
| | 1 | 1 | 0 | 0 | Document bitstream of document 2 |
| & | 1 | 1 | 0 | 0 | Searcher bitstream |
| = | 1 | 1 | 0 | 0 | Result of bit calculation |
| Searcher bitstream | 1 | 1 | 0 | 0 | Is result of bit calculation the same as searcher bitstream? |

Table 9 represents the result "1100" of a logical AND operation between bitstream values of the document bitstream "1100" of the document 2 in Table 7 and the searcher bitstream values "1100" in Table 8. In this case, the resulting bitstream "1100" is the same as the searcher bitstream, thus indicating that the searcher bitstream and the document bitstream of the document 2 are the same as each other. This indicates that the document 2 is a document of a type the searcher has searched for.

Table 10 below presents another example of bit calculation.

TABLE 10

| | Bit | | | | Description |
|---|---|---|---|---|---|
| | 3 | 2 | 1 | 0 | |
| | 0 | 1 | 0 | 0 | Document bitstream of document 6 |
| & | 1 | 1 | 0 | 0 | Searcher bitstream |
| = | 0 | 1 | 0 | 0 | Result of bit calculation |
| Searcher bitstream | 1 | 1 | 0 | 0 | Is result of bit calculation the same as searcher bitstream? |

Table 10 represents the result "0100" of a logical AND operation between the document bitstream "0100" of the document 6 in Table 7 and the searcher bitstream "100" in Table 8. In this case, since the resulting bitstream "0100" is not the same as the searcher bitstream, the processor 222 determines that the document 6 is not a document of a type (e.g., the location type and the URL link type simultaneously) the searcher has searched for.

As such, the server 150 may easily and simply determine the documents of the type the searcher may search for based on the result of simple bit calculation for bitstreams, thus reducing costs such as memory usage or the required computational capacity.

A description of various types of documents and a processor of determining a correspondence between a document and one searched for by a user have been described above with reference to Tables 6 to 10. However, the scope and spirit of inventive concepts are not limited thereto. For example, categories of types or the number of the types may be determined/changed in various ways other than that described above.

Furthermore, example embodiments above describe how to search for a document of the type a searcher may be looking for. However, the described example embodiments are non-limiting. For example, it is possible to search for a document by combining various conditions. For example, the server 150 may search for a document of the type the searcher is searching for among documents which are accessible by the searcher.

Figure 7:
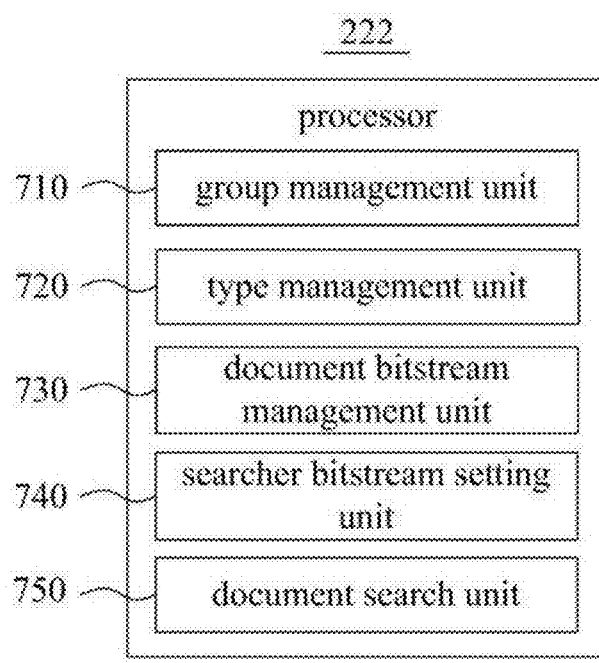
FIG. 7 is a block diagram illustrating a detailed configuration of a processor of a server according to an example embodiment.
Figure 8:
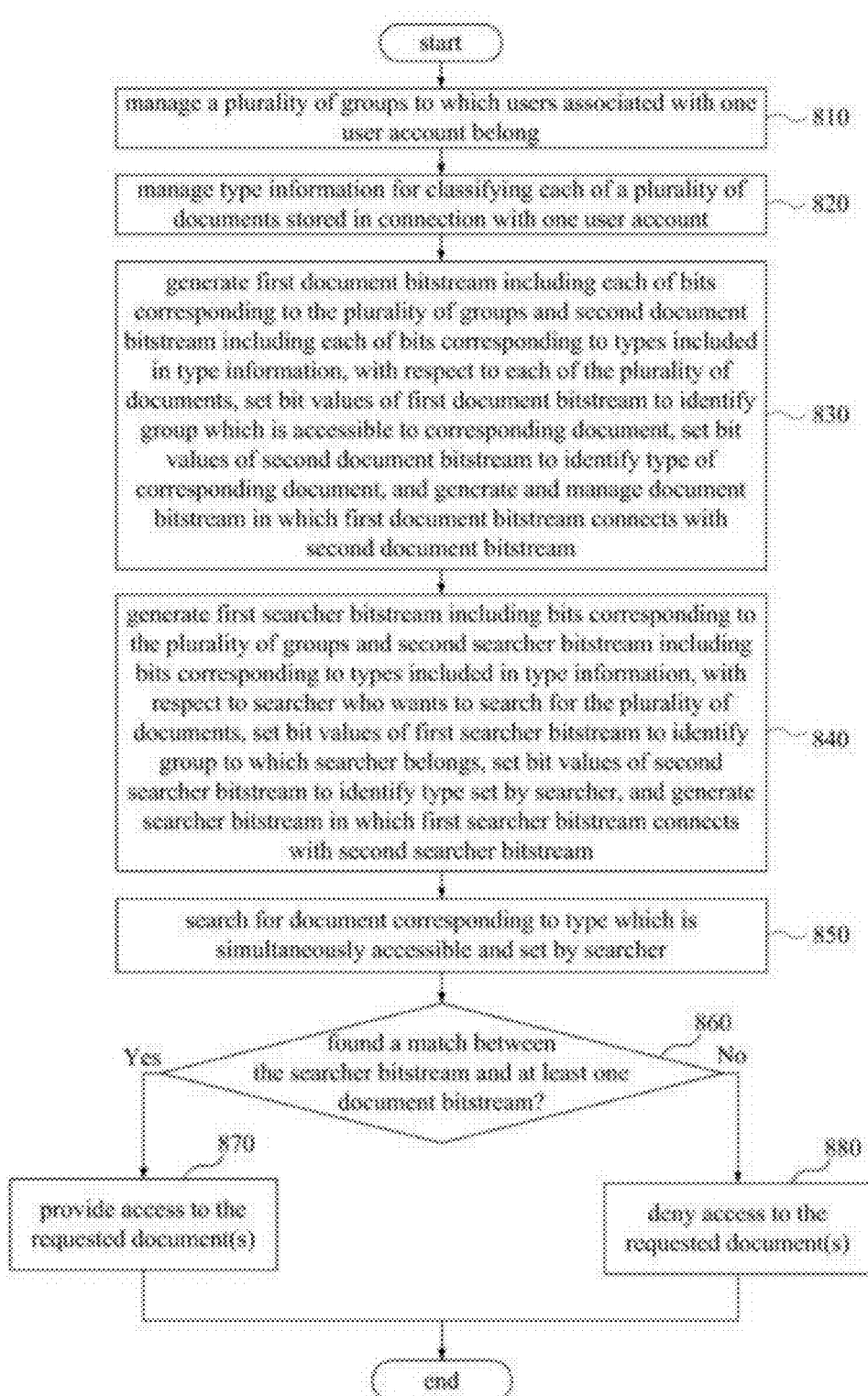
FIG. 8 is a flowchart illustrating a method performed by a server according to an example embodiment.

FIG. 7 is a block diagram illustrating a detailed configuration of a processor of a server according to an example embodiment. FIG. 8 is a flowchart illustrating a method performed by a server according to an example embodiment. As shown in FIG. 7, a processor 222 of a server 150 of FIG. 2 may include a group management unit 710, a type management unit 720, a document bitstream management unit 730, a searcher bitstream setting unit 740, and a document search unit 750. While FIG. 7 illustrates the processor 222 as having various units for performing various functions, the functionalities associated with each unit may be stored as computer-readable instructions on the memory 221 such that when loaded into the processor 222, they transform the processor into a special purpose processor for carrying out the functionalities of units 710-740. Furthermore, steps of FIG. 6 will be described below with reference to the server 150. However, it will be understood that the processor 222 carries out said steps by executing corresponding computer-readable instructions stored on the memory 221.

In step 810, the server 150 may manage a plurality of groups to which users associated with one user account belong. For example, the processor 222 may execute computer-readable instructions associated with the group management unit 710 to execute step 810. Since the description of the plurality of groups has been provided above in detail, the repeated description thereof will be omitted for sake of brevity.

In step 820, the server 150 may manage type information for classifying each of a plurality of documents stored in connection with the one user account. For example, the processor 222 may execute computer-readable instructions associated with the type management unit 720 to perform step 820. The type information may refer to information about types of documents. Since the description of the type of the documents has been provided above in detail, the repeated description will thereof be omitted for sake of brevity.

In one example embodiment, the order of executing step 810 and step 820 may be switched.

In step 830, the server 150 may generate a first document bitstream including each of the bits corresponding to the plurality of groups and a second document bitstream including each of the bits corresponding to types included in the type information. Furthermore, with respect to each of the plurality of documents, the server 150 may set bit values of the first document bitstream to identify a group for which a corresponding document is accessible. The server 150 may set bit values of the second document bitstream to identify a type of the corresponding document, and may generate and manage a document bitstream in which the first document bitstream connects with the second document bitstream. For example, the processor 222 may execute computer-readable instructions associated with the document bitstream management unit 730 to perform step 830.

In one example embodiment, the first document bitstream may correspond to a document bitstream for a group described with reference to FIGS. 3 and 4, and the second document bitstream may correspond to a document bitstream for a type described with reference to FIGS. 5 and 6. The server 150 may generate and manage one document bitstream by connecting the first document bitstream with the second document bitstream. In this case, a bit index of the document bitstream may be set to be classified for a group and a type.

For example, Table 11 below represents examples of document bitstreams for groups and types of documents. Bit indexes of the first document bitstream for the type are changed from bit indexes 0, 1, 2, and 3 of Table 6 to bit indexes 15, 16, 17, and 18, respectively, based on connection between the first document bitstream and the second document bitstream. Also, there may be more groups and more types. However, some of these groups and types are omitted and represented in Table 11.

TABLE 11

| Document ID | Bit | | | | | | | | | | Type | Accessible Group |
|---|---|---|---|---|---|---|---|---|---|---|---|---|
| | 18 | 17 | 16 | 15 | ... | 5 | 4 | 3 | 2 | 1 0 | | |
| 1 | 0 | 0 | 1 | 0 | ... | 0 | 0 | 0 | 1 | 0 0 | Video | School |
| 2 | 1 | 1 | 0 | 0 | ... | 0 | 0 | 0 | 0 | 1 0 | Location, URL link | Friend |
| 3 | 0 | 0 | 0 | 0 | ... | 0 | 0 | 0 | 0 | 0 1 | Text | Public |
| 4 | 0 | 0 | 0 | 1 | ... | 0 | 0 | 1 | 0 | 0 0 | Photo | Company |
| 5 | 0 | 0 | 0 | 0 | ... | 0 | 0 | 0 | 0 | 0 0 | Text | Private |
| 6 | 0 | 1 | 0 | 0 | ... | 0 | 1 | 0 | 1 | 0 0 | Location | School, Baseball club |
| 7 | 0 | 0 | 0 | 1 | ... | 0 | 1 | 1 | 0 | 0 0 | Photo | Company, Baseball club |
| 8 | 1 | 1 | 0 | 0 | ... | 0 | 0 | 0 | 1 | 0 0 | Location, URL link | School |
| 9 | 0 | 0 | 1 | 0 | ... | 1 | 0 | 0 | 0 | 0 0 | Video | Family |

In Table 11 and in one example embodiment, it may be known that the document 1 is a document of the video type, which is accessible by users of the school group. In one example embodiment, it may be known that the document 2 is a document of the location type and the URL link type, which is accessible by users of the friend group.

In step 840, the server 150 may generate a first searcher bitstream including bits corresponding to the plurality of groups and a second searcher bitstream including bits corresponding to types included in the type information. Furthermore, the server 150, with respect to a searcher who wants to search for the plurality of documents, may set bit values of the first searcher bitstream to identify a group to which the searcher belongs, may set bit values of the second searcher bitstream to identify a type set by the searcher, and may generate a searcher bitstream in which the first searcher bitstream connects with the second searcher bitstream. For example, the processor 222 may execute computer-readable instructions associated with the searcher bitstream setting unit 740 to perform step 840.

In one example embodiment, the first searcher bitstream may correspond to a searcher bitstream for a group described with reference to FIGS. 3 and 4, and the second searcher bitstream may correspond to a searcher bitstream for a type described with reference to FIGS. 5 and 6. The server 150 may generate one searcher bitstream by connecting the first searcher bit stream with the second searcher bitstream.

Table 12 below represents an example of the searcher bitstream in which the first searcher bitstream connects with the second searcher bitstream.

TABLE 12

| User ID | Bit | | | | | | | | | | Accessible Type | Group |
|---|---|---|---|---|---|---|---|---|---|---|---|---|
| | 196 | 195 | 194 | 193 | ... 5 | 4 | 3 | 2 | 1 | 0 | | |
| User a | 1 | 1 | 0 | 0 | ... 0 | 1 | 0 | 1 | 1 | 1 | Location, URL link | Public, Friend, School, Baseball club |

In step 850, the server 150 may search for a document which is accessible by the searcher and simultaneously corresponds to a type set by the searcher by comparing bit values between each of document bitstreams generated for the plurality of documents and the searcher bitstream.

Thereafter, at step 860, the server 150 determines whether a match has been found between the searcher bitstream and at least one document bitstream during the search performed at 850.

If at 860, the server 150 determines that a match has been found, then at 870, the server 150 grants access to the requested document(s). However, if at 860, the server 150 determines that a match has not been found, then at 880, the server 150 denies access to the requested document(s). Thereafter, the process may end.

In one example embodiment, the server 150 may provide a notification (e.g., a message) to the searcher to notify the search of the decision at 870 or 880.

In one example embodiment, the result of performing a logical AND operation between bit values of a document bitstream set for a first document among the plurality of documents and bit values of a searcher bitstream, may be referred to as the calculated bitstream. If a bit value of a first portion of the calculated bitstream corresponding to the first document is not 0 (i.e., it is 1) and if a bit value of a second portion of the calculated bitstream is the same as a corresponding bit value of the searcher bitstream, the server 150 determines the first document as a document which is simultaneously accessible and defined by the searcher.

Table 13 below represents an example of comparing a document bitstream with a searcher bitstream.

TABLE 13

| | Bit | | | | | | | | | | Description |
|---|---|---|---|---|---|---|---|---|---|---|---|
| | 18 | 17 | 16 | 15 | ... 5 | 4 | 3 | 2 | 1 | 0 | |
| | 1 | 1 | 0 | 0 | ... 0 | 0 | 0 | 0 | 1 | 0 | Document bitstream of document 2 |
| & | 1 | 1 | 0 | 0 | ... 0 | 1 | 0 | 1 | 1 | 1 | Searcher bitstream |
| = | 1 | 1 | 0 | 0 | ... 0 | 0 | 0 | 0 | 1 | 0 | Result of bit calculation |
| Comparison value | 1 | 1 | 0 | 0 | ... 0 | 0 | 0 | 0 | 0 | 0 | Is result of bit calculation greater than comparison value? |

Table 13 represents the calculated bitstream "1100 . . . 000010" of a logical AND operation between the document bitstream "1100.000010" of the document 2 and the searcher bitstream "1100 . . . 010111". In this case, since the bit value "000010" of a first portion of the calculated bitstream corresponding to document 2 is not 0 in the result and since the bit value "1100" of a second portion of the calculated bitstream is the same as the corresponding bit value "1100" of the searcher bitstream in the result, document 2 the document which is accessible by the searcher and has the location type and the URL link type. The "comparison value" in Table 13 is a value in which all of the bit values of the bitstream corresponding to the first portion of the calculated bitstream are set to 0. If the result is greater than the "comparison value", the corresponding document (e.g., document 2) meets a condition based on a group and a type. In other words, if the result is greater than the "comparison value", the corresponding document may be a document which is accessible by the searcher and has a type set by the searcher.

Figure 9:
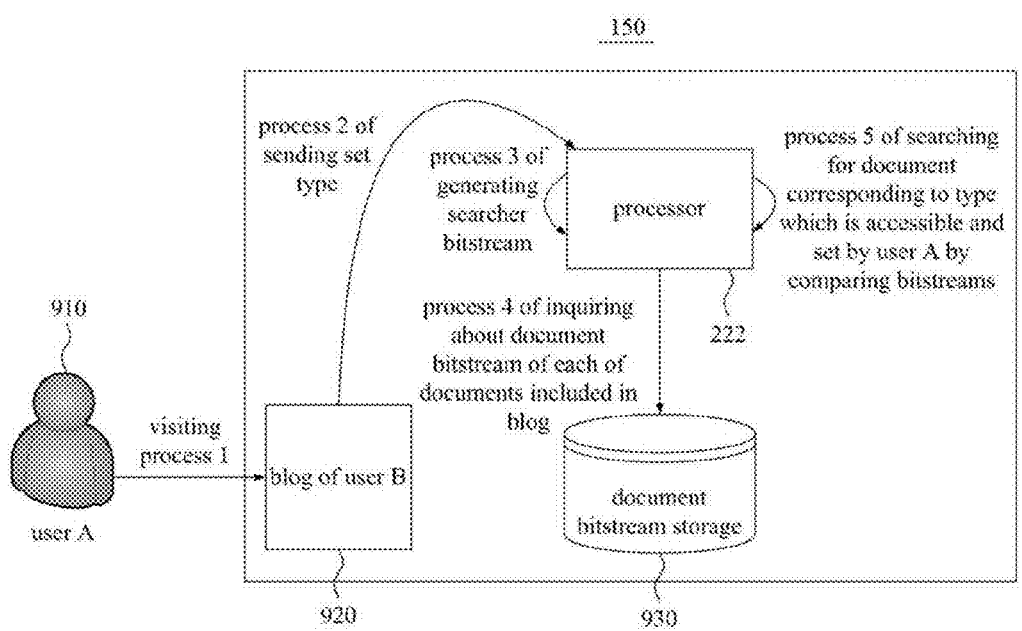
FIG. 9 illustrates a process of searching for a document and providing the searched document to a searcher according to an embodiment.

FIG. 9 is a drawing illustrating a process of searching for a document and providing the searched document to a searcher according to an example embodiment.

A process 1 may be a process in which a user A 910 visits a blog 920 of a user B. For example, the user A 910 may connect to the blog 920 of the user B provided from a server 150 through a network 170 of FIG. 2 using an electronic device 110 of FIG. 2.

A process 2 may be a process in which a type set through the blog 920 of the user B is sent to a processor 222 of the server 150. For example, the blog 920 may include a user interface for setting a type of a document the user A 910 wants. The user A 910 may set a type of a document to be searched for, using the user interface of the blog 920. In this case the set type may be sent to the processor 222 of the server 150.

A process 3 may be a process in which the processor 222 generates a searcher bitstream. For example, the processor 222 may verify a group to which the user A 910 belongs among groups of the blog 920 using log-in information of the user A 910. In this case, the processor 222 may generate a first searcher bitstream based on the verified group and a second searcher bitstream based on the sent type, may set a bit value, and may generate a searcher bitstream by connecting the first searcher bitstream with the second searcher bitstream.

A process 4 may be a process in which the processor 222 searches for a document bitstream of each of documents (posts) included in the blog 920 from a document bitstream storage 930. As such, the bitstreams for the documents may have been previously generated and stored in the document bitstream storage 930 for each blog (or for each user account).

A process 5 may be a process in which the processor 222 searches for a document which is accessible by the user A 910 and corresponds to a type set by the user A 910 by comparing bitstreams, as described above.

The found document may be exposed to the user A 910 through the blog 920.

As such, according to example embodiments of inventive concepts, the system may change and manage information about a group which has access right to a document and a type of the document to bit information for each document, may generate bit information corresponding to a group to which the searcher belongs and a type set by the searcher, and may efficiently search for a document which is accessible by the searcher and/or a document of the type set by the searcher based on bit comparison between bitstreams. Also, the system may search for a document by comparing bit values with a little amount of calculation, thus performing calculation for searching for the document at high speed. The system may separate and search for only information necessary for a search in the form of metadata of a bitstream structure, thus reducing memory capacity required to search for the information.

The foregoing devices may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

According to an example embodiment, the system may search for a document by comparing bit values with a relatively minimum amount of computation, thus performing the search for document at a relatively higher speed. The system may separate and search for only information necessary for a search in the form of metadata of a bitstream structure, thus reducing memory capacity required to search for the information.

Therefore, other implements, other example embodiments, and equivalents to claims are within the scope of the following claims.

What is claimed:

1. A server comprising:
   a memory having computer-readable instructions stored therein; and
   a processor configured to execute the computer-readable instructions to,
      generate a document tag for a document, the document tag including a first stream of bits identifying at least one of a first association and a second association for the document, the first association being an association between the document and at least one of a plurality of groups, the second association being an association between the document and one of a plurality of document types such that bits of the first stream of bits having a first value indicate an existence of the at least one of the first association and the second association and bits of the first stream of bits having a second value indicate absence of the at least one of the first association and the second association,
      generate a user tag, the user tag including a second stream of bits identifying at least one of a third association and a fourth association for a user, the third association being an association between the user and at least one of the plurality of groups, the fourth association being an association between a type of a document requested by the user and at least one of the plurality of document types such that bits of the second stream of bits having the first value indicate an existence of the at least one of the third association and the fourth association and bits of the second stream of bits having the second value indicate absence of the at least one of the third association and the fourth association, and
      selectively provide access to the requested document based on the existence of the at least one of the first association and the second association and the existence the at least one of the third association and the fourth association such that the server is configured to selectively provide the access by assessing the at least one of the first association and the second association via the first stream of bits and the second stream of bits.

2. The server of claim 1, wherein the processor is configured to execute the computer-readable instructions to,
   perform an operation using the document tag and the user tag, and
   provide access to the requested document based on a result of the operation.

3. The server of claim 2, wherein the processor is configured to execute the computer-readable instructions to, compare the result of the operation to a value to generate an output, and provide access to the requested document if the output is greater than the value.

4. The server of claim 2, wherein the document tag has a first portion and a second portion, the first portion corresponding to the first association, the second portion corresponding to the second association, the user tag has a third portion and a fourth portion, the third portion corresponding to the third association, the fourth portion corresponding to the fourth association, and the result of the operation has a fifth portion and a sixth portion, the fifth portion corresponding to a result of the operation between the first and third portions, the sixth portion corresponding to a result of the operation between the second and fourth portions.

5. The server of claim 4, wherein the processor is configured to execute the computer-readable instructions to provide access to the requested document, if the fifth portion of the result is greater than the first value and the sixth portion of the result is the same as the second and fourth portions.

6. The server of claim 2, wherein the processor is configured to execute the computer-readable instructions to, store a first plurality of tags for the plurality of groups, store a second plurality of tags for the plurality of document types, select, as a first tag, one of the first plurality of tags that identifies the first association, select, as a second tag, one of the second plurality of tags that identifies the second association, and generate the document tag by combining the first tag and the second tag.

7. The server of claim 6, wherein the processor is configured to execute the computer-readable instructions to generate the user tag by, identifying the third association by determining one or more of the plurality of groups to which the user belongs, identifying the fourth association by determining one or more of the plurality of document types associated with the requested document, generating a third tag for the third association, generating a fourth tag for the fourth association, and combining the third tag and the fourth tag to generate the user tag.

8. The server of claim 7, wherein the first tag is a stream of bits in which one or more bits corresponding to one or more of the plurality of groups to which the document belongs have the first value, while remaining bits of the first tag have the second value, the second tag is a stream of bits in which one or more bits corresponding to one or more of the plurality of document types to which the document belongs have the first value, while remaining bits of the second tag have the second value, the third tag is a stream of bits in which one or more bits corresponding to the one or more of the plurality of groups to which the user belongs have the first value, while remaining bits of the third tag have the second value, and the fourth tag is a stream of bits in which one or more bits corresponding to the requested document have the first value, while remaining bits of the fourth tag have the second value.

9. The server of claim 8, wherein the processor is configured to execute the computer-readable instructions to perform the operation by performing a logical AND operation between the document tag and the user tag.

10. The server of claim 1, wherein each of the plurality of groups has one or more users associated therewith, and the plurality of document types include a single one of or a combination of a video type, a text type, a location type, and a photo type.

11. A non-transitory computer-readable medium comprising computer-readable instructions, which when executed by a processor, cause the processor to, generate a document tag for a document, the document tag including a first stream of bits identifying at least one of a first association and a second association for the document, the first association being an association between the document and at least one of a plurality of groups, the second association being an association between the document and one of a plurality of document types such that bits of the first stream of bits having a first value indicate an existence of the at least one of the first association and the second association and bits of the first stream of bits having a second value indicate absence of the at least one of the first association and the second association, generate a user tag, the user tag including a second stream of bits identifying at least one of a third association and a fourth association for a user, the third association being an association between the user and at least one of the plurality of groups, the fourth association being an association between a type of a document requested by the user and at least one of the plurality of document types such that bits of the second stream of bits having the first value indicate an existence of the at least one of the third association and the fourth association and bits of the second stream of bits having the second value indicate absence of the at least one of the third association and the fourth association, and selectively provide access to the requested document based on the existence of the at least one of the first association and the second association and the existence of the at least one of the third association and the fourth association such that the processor is configured to selectively provide the access by assessing the at least one of the first association and the second association via the first stream of bits and the second stream of bits.

12. The non-transitory computer-readable medium of claim 11, wherein execution of the computer-readable instructions by the processor further cause the processor to, perform an operation using the document tag and the user tag, and provide access to the requested document based on a result of the operation.

13. The non-transitory computer-readable medium of claim 12, wherein execution of the computer-readable instructions by the processor further cause the processor to, compare the result of the operation to a value to generate an output, and provide access to the requested document if the output is greater than the value.

14. The non-transitory computer-readable medium of claim 12, wherein
the document tag has a first portion and a second portion, the first portion corresponding to the first association, the second portion corresponding to the second association,
the user tag has a third portion and a fourth portion, the third portion corresponding to the third association, the fourth portion corresponding to the fourth association, and
the result of the operation has a fifth portion and a sixth portion, the fifth portion corresponding to a result of the operation between the first and third portions, the sixth portion corresponding to a result of the operation between the second and fourth portions.

15. The non-transitory computer-readable medium of claim 14, wherein execution of the computer-readable instructions by the processor further cause the processor to provide access to the requested document, if the fifth portion of the result is greater than a first value and the sixth portion of the result is the same as the second and fourth portions.

16. The non-transitory computer-readable medium of claim 12, wherein execution of the computer-readable instructions by the processor further cause the processor to,
store a first plurality of tags for the plurality of groups,
store a second plurality of tags for the plurality of document types,
select, as a first tag, one of the first plurality of tags that identifies the first association,
select, as a second tag, one of the second plurality of tags that identifies the second association, and
generate the document tag by combining the first tag and the second tag.

17. The non-transitory computer-readable medium of claim 16, wherein execution of the computer-readable instructions by the processor cause the processor to generate the user tag by,
identifying the third association by determining one or more of the plurality of groups to which the user belongs,
identifying the fourth association by determining one or more of the plurality of document types associated with the requested document,
generating a third tag for the third association,
generating a fourth tag for the fourth association, and
combining the third tag and the fourth tag to generate the user tag.

18. The non-transitory computer-readable medium of claim 17, wherein
the first tag is a stream of bits in which one or more bits corresponding to one or more of the plurality of groups to which the document belongs have the first value, while remaining bits of the first tag have the second value,
the second tag is a stream of bits in which one or more bits corresponding to one or more of the plurality of document types to which the document belongs have the first value, while remaining bits of the second tag have the second value,
the third tag is a stream of bits in which one or more bits corresponding to the one or more of the plurality of groups to which the user belongs have the first value, while remaining bits of the third tag have the second value, and
the fourth tag is a stream of bits in which one or more bits corresponding to the requested document have the first value, while remaining bits of the fourth tag have the second value.

19. The non-transitory computer-readable medium of claim 18, wherein the processor is configured to execute the computer-readable instructions to perform the operation by performing a logical AND operation between the document tag and the user tag.

20. The non-transitory computer-readable medium of claim 11, wherein
each of the plurality of groups has one or more users associated therewith, and
the plurality of document types include a single one of or a combination of a video type, a text type, a location type, and a photo type.

* * * * *